(12) United States Patent
Kurthy

(10) Patent No.: US 10,800,950 B2
(45) Date of Patent: Oct. 13, 2020

(54) CIGAR GLUE AND METHOD OF USE

(71) Applicant: PERFEC CIGAR SOLUTIONS, INC., Irvine, CA (US)

(72) Inventor: Rodger Kurthy, Coto de Caza, CA (US)

(73) Assignee: Perfec Cigar Solutions, Inc., Coto de Caza, CA (US)

( * ) Notice: Subject to any disclaimer, the term of this patent is extended or adjusted under 35 U.S.C. 154(b) by 0 days.

(21) Appl. No.: 16/216,600

(22) Filed: Dec. 11, 2018

(65) Prior Publication Data

US 2019/0177580 A1    Jun. 13, 2019

Related U.S. Application Data

(60) Provisional application No. 62/597,360, filed on Dec. 11, 2017.

(51) Int. Cl.

| | |
|---|---|
| C09J 11/08 | (2006.01) |
| A24C 1/34 | (2006.01) |
| A24C 1/38 | (2006.01) |
| C09J 9/00 | (2006.01) |
| A24D 1/02 | (2006.01) |
| C08K 7/02 | (2006.01) |

(52) U.S. Cl.
CPC .......... *C09J 11/08* (2013.01); *A24C 1/34* (2013.01); *A24C 1/38* (2013.01); *A24D 1/025* (2013.01); *C09J 9/00* (2013.01); *C08K 7/02* (2013.01); *C09J 2401/00* (2013.01)

(58) Field of Classification Search
None
See application file for complete search history.

(56) References Cited

U.S. PATENT DOCUMENTS

| | | | |
|---|---|---|---|
| 6,482,876 B1 * | 11/2002 | Witt-Nuesslein | C04B 28/26 524/35 |
| 2009/0298976 A1 * | 12/2009 | Yano | C08J 5/045 524/35 |
| 2018/0134926 A1 * | 5/2018 | Lei | C09J 7/20 |
| 2019/0071245 A1 * | 3/2019 | Paetow | C04B 28/04 |

\* cited by examiner

*Primary Examiner* — Michael H. Wilson
*Assistant Examiner* — Katherine A Will
(74) *Attorney, Agent, or Firm* — Knobbe Martens Olson & Bear, LLP

(57) ABSTRACT

Cigar repair glues containing a quantity of insoluble fibers and methods of repairing cigars using such fiber-containing glues. Fibrous or matting cigar glues and/or adhesives may be prepared by mixing a quantity of glue or adhesive with a quantity of insoluble or substantially insoluble fiber, such as cellulose fibers. The method of using the fibrous or matting cigar glues and/or adhesives may include various steps, which may include: identifying an air leak or discontinuity in a cigar wrapper; preparing the fibrous or matting glue to encourage fiber mixing/suspension; and applying the prepared fibrous or matting glue to the desired location on the cigar.

16 Claims, 6 Drawing Sheets

200

CIGAR GLUE AND METHOD OF USE

CROSS-REFERENCE TO RELATED APPLICATIONS

This application claims the priority benefit to U.S. Provisional No. 62/597,360 filed Dec. 11, 2017, the entirety of which is hereby incorporated by reference herein.

BACKGROUND

Field

The present application relates generally to cigar repair glues and methods for repairing cigars using such glues, and more specifically, relates to cigar repair glues containing a quantity of insoluble fibers and methods of repairing cigars using such fiber-containing glues.

Description of the Related Art

Cigarette smokers typically smoke routinely, multiple times per day, and think little about the smoking experience. By contrast, cigar enthusiasts come in a broad spectrum ranging from the beginner enthusiast who may smoke a cigar only sporadically, to a cigar enthusiast who smokes every day. A beginner cigar enthusiast enjoys a cigar and is generally interested in the finer details of cigar enjoyment and smoking. However, he or she may not have the drive, ability, or funds to smoke cigars frequently. Nevertheless, when they do enjoy a cigar, they appreciate the finer techniques and sensory experiences involved in smoking a cigar. And, in between smoking their periodic cigar, a beginner cigar enthusiast may contemplate and look forward to their next cigar, whenever it may be. An advanced cigar enthusiast, of course, is generally well aware of the science and art behind cigar smoking. For example, he or she frequently has a very well stocked tool kit (sometimes having multiple of each tool), is knowledgeable about the source of the cigar and/or grower of the tobacco, and fully appreciates the ritual of cigar smoking. However, the average cigar smoker smokes only a few times per month.

Cigar enthusiasts typically look forward to smoking a cigar, most often with friends, as an event. For example, when planning their weekend round of golf with friends, the enthusiast may specifically look forward to the cigar they will enjoy while playing golf, and the cigar(s) they may enjoy over drinks after the game. In fact, many cigar enthusiasts appreciate the ritual of cigar smoking as much, if not more than the simple act of smoking a cigar. The ritual of cigar smoking is frequently a social event in which two or more individuals experience and explore their shared interest in cigars and the art and science behind a high quality cigar. The ritual is so social, in fact, that cigar smokers need not even know each other previously to experience a satisfying bonding time. The enthusiasts may discuss: the origins of their cigars, such as the soil qualities that produced the fine tobacco contained in their respective cigars or the country from which their cigars came; comparisons between cigars they have recently enjoyed; their favorite local, domestic, and foreign sources of cigars; their cigar care preferences, such as their home and/or travel humidor(s); and their unique cigar tools and kit.

The cigar enthusiast is not frequently found without his or her cigar kit. Most cigar kits include a cigar lighter or torch, a cigar cutter, and a small cigar case or pouch used to transport one or more cigars. The cigar kit is frequently a source of pride and individuality for the cigar enthusiast. In fact, the cigar enthusiast's cigar kit will frequently include more than one cigar lighter or torch and several cigar cutters, all of different designs and with different stories.

Prior to enjoying a cigar, the cigar enthusiast spreads out their tools in front of them. After organizing and arranging their tools, and sharing select stories behind each of them, the enthusiast removes one or more cigars from their case. Cigar enthusiasts usually critically evaluate their cigars throughout the cigar smoking ritual. In fact, evaluating the cigars' characteristics may be considered part of the ritual and important to fully enjoying the event. The cigar enthusiast may contemplate the flavor palate they desire and which cigar would consequently be the most satisfying at that time. Frequently, a group of cigar enthusiasts will discuss the positive desirable qualities and possibly the less desirable or negative qualities of each of their cigars, respectively. Each member of the experience will generally offer input on which cigar should be selected—the more the smoker enjoys his or her cigar, the better the group's experience will generally be, collectively. The individual smoker will feel his or her cigars, including the surface of the cigar: whether the cigar is smooth, rough, velvety, dry, oily, pliable, crackly, brittle, hard, lumpy, etc. He or she may then smell the cigar, both for enjoyment and to evaluate the quality of the cigar, and contribute to the selection process. He may look very carefully at the cigar. He may look for evenness of color of the cigar. They may look for the number and size of the veins in the cigar wrapper (the outer tobacco leaf that covers the surface of the cigar). The cigar enthusiast may feel the cigar for density, to see how tightly packed it may be. While each cigar enthusiast may undertake the tactile and olfactory evaluation of his or her cigars individually, the group may also help each other collectively in this process. Generally, the cigar smokers will admire the cigars and share their thoughts and impression on the subjective and objective qualities of each individual cigar. While cigar enthusiasts may carry several cigars with them at any point in time, it is frequently the case that the enthusiast will believe that only one of those cigars is perfect or right for any given situation or set of circumstances. The perfect cigar may not be right for a different situation or set of circumstances. For this reason, the selection process is critical. After the cigar enthusiast has selected the perfect cigar, they may prepare to cut the end of the cigar. Before the cigar enthusiast cuts the cigar, he or she may study the end of the cigar, deciding exactly where to cut off the tip of the cigar.

The cut is one of the most important steps in preparing the cigar because: first, it is undesirable to make many small, "shaving" cuts; and second, any cut into the cigar is permanent. The enthusiast will generally select the proper cigar cutter for the individual application. He or she may consider which cutter has the proper diameter to accommodate the cigar chosen and which cutter has a set of blades sharp enough to make a satisfactory cut. Then, the cigar is carefully examined, particularly the head of the cigar. The enthusiast will, almost always, carefully evaluate the increasing diameter of the head of the cigar to determine the most pleasing location for the cut—that is the portion of the cigar that is placed in the smoker's mouth. The cut portion is the part of the cigar that is most intimately connected with the enthusiast throughout the entire smoking process. Therefore, the desirability of the cut is of paramount importance to the enthusiast. Once the cigar enthusiast's study of the cigar's head is complete and the perfect location for the cut determined, the enthusiast decisively makes a precise cut through the head of the cigar. Following the cut, the cigar enthusiast may observe and evaluate the accuracy and smoothness of the cut. If the enthusiast is displeased with the cut, he or she may carefully "correct" the cut with a second cut. After the cut is made, the lighting process is begun.

Lighting the cigar has several steps, the first of which is toasting. To toast the cigar, the enthusiast holds the cigar in such a manner to have the foot of the cigar, which is the end to which the flame will be applied, somewhat facing him. He may intently study the foot of the cigar as he runs a flame over the end of the cigar—round and round and round. Frequently, a flame from a wooden match or a butane lighter is used for the toasting process. Many cigar enthusiasts have found that a deliberate, slow toasting on the foot of the cigar can get the ash going well at the start of the smoking experience. Consequently, a toasted cigar may have a better chance of burning evenly all the way through. The intent and purpose behind toasting is to set fire to all parts of the cigar (not just the tobacco filler), including the binder, wrapper, and filler. In the absence of toasting it is common to only ignite one part of the foot of the cigar, thereby causing an uneven burn. Toasting is properly accomplished by holding a cigar at an angle (e.g., 45-60 degrees) over a flame. The flame may or may not touch the tobacco at the foot. Many cigar smokers rotate the cigar until the foot begins to glow uniformly. Care may be taken not to overheat the cigar because the more a cigar is heated, the more tars form within the cigar. Once the enthusiast believes the foot of the cigar has been evenly toasted, the cigar may be lit with the flame. This is accomplished by placing the head of the cigar in their mouth and drawing air through the cigar while holding the flame to the foot of the cigar. The flame may be continually rotated around the surface of the foot of the cigar, or alternatively, the flame may be held in one steady position while the cigar smoker rotates the cigar while sucking air through the cigar. The intent is to create a uniform glowing red of the end of the cigar, commonly known as an "even burn." Once the enthusiast believes the foot of the cigar has an even burning ember, he will generally remove the cigar from his mouth, turn the cigar around, and gently blow on the burning foot of the cigar. Blowing air onto the foot of the cigar will cause the ember of the cigar to glow with a red burn confirming the foot of the cigar is evenly and thoroughly lit. This is commonly referred to as a "good burn."

If the cigar enthusiast does not see that the glowing red covers the entire foot of the cigar, he or she may again use/apply the flame while drawing air through the cigar, and then re-check the foot of the cigar for an even burn. Then each enthusiast tastes the smoke of his or her cigar. Then, the cigar enthusiasts will take a fresh, enjoyable draw on their cigars. The cigar is then ready for continued smoking.

Performing one or more of the above-listed steps prior to smoking a cigar may be part of the desired ritual and enjoyment for the cigar enthusiast. And, precision in any steps performed is important to the cigar enthusiast's enjoyment.

SUMMARY

The present disclosure provides for various systems, devices, and methods for repairing a leak in a cigar. In some embodiments, disclosed is an adhesive for use on an air leak on a cigar. In some embodiments, the adhesive comprises an insoluble fiber material. In some embodiments, the fiber material comprises fibers having an average length less than about 1000 µm. In some embodiments, the fibers have an average diameter of less than about 100.

In other embodiments, the fiber material of the adhesive is configured to remain intact one year after mixing the fiber material in the adhesive, wherein the fiber material comprises at least about 65% by weight of the adhesive. In other embodiments, the fibers of the adhesive are configured to remain intact six months after mixing at least about 65% fiber in the adhesive. In other embodiments, the fibers of the adhesive are configured to remain at least 90% intact for at least 1 month.

In other embodiments, the adhesive comprises less than about 60% of insoluble fibers by weight. In other embodiments, the adhesive comprises between about 1 and about 30% insoluble fibers by weight. In other embodiments, the fibers of the adhesive have a length of between about 40 µm and about 120 µm. In other embodiments, the fibers of the adhesive have a diameter between about 1 µm and about 3 µm.

In other embodiments, the fibers of the adhesive comprise cellulose. In other embodiments, the fibers of the adhesive are configured to form a net over the air leak. In other embodiments, the adhesive is configured to form a matting or woven glue. In other embodiments, the fibers of the adhesive are configured to create a mat over the air leak even without complete drying of the adhesive.

In some embodiments, disclosed is a method of producing a fibrous adhesive for use on an air leak on a cigar. In some embodiments, the method includes measuring a quantity of cigar glue. In some embodiments, the method includes measuring a quantity of fiber material, wherein the fiber material is insoluble and comprises fibers having an average length between about 40 µm and about 120 µm, and an average diameter of between about 1 µm and about 3 µm. In some embodiments, the method includes mixing the quantity of cigar glue with the quantity of fiber material to form a mixture. In some embodiments, the method includes packaging the mixture to form the fibrous adhesive. In some embodiments, the method includes storing the fibrous adhesive in a container comprising metal particles. In some embodiments, the method includes actuating the metal particles to re-suspend the fibers.

In some embodiments, disclosed is a method of repairing a cigar using and adhesive. In some embodiments, the method includes identifying a target location on the cigar comprising a defect. In some embodiments, the method includes providing a reservoir comprising a fibrous adhesive comprising a quantity of cigar glue and a quantity of fiber material comprising insoluble fibers. In some embodiments, the method includes actuating the fibrous adhesive to re-suspend the fibers in the fibrous adhesive. In some embodiments, the method includes applying the fibrous adhesive to the target location on the cigar.

In other embodiments, the method includes compacting the fibrous adhesive on the cigar. In other embodiments, the method includes sealing the target location on the cigar, wherein the fibrous adhesive forms a net over the target location. In other embodiments, the fibrous adhesive of the method comprises fibers having an average length between about 40 µm and about 120 µm and an average diameter of between about 1 µm and about 3 µm

BRIEF DESCRIPTION OF THE DRAWINGS

FIG. 1B is a pyramid cigar while FIG. 1C is a perfecto cigar.

DETAILED DESCRIPTION

Figure 1A:
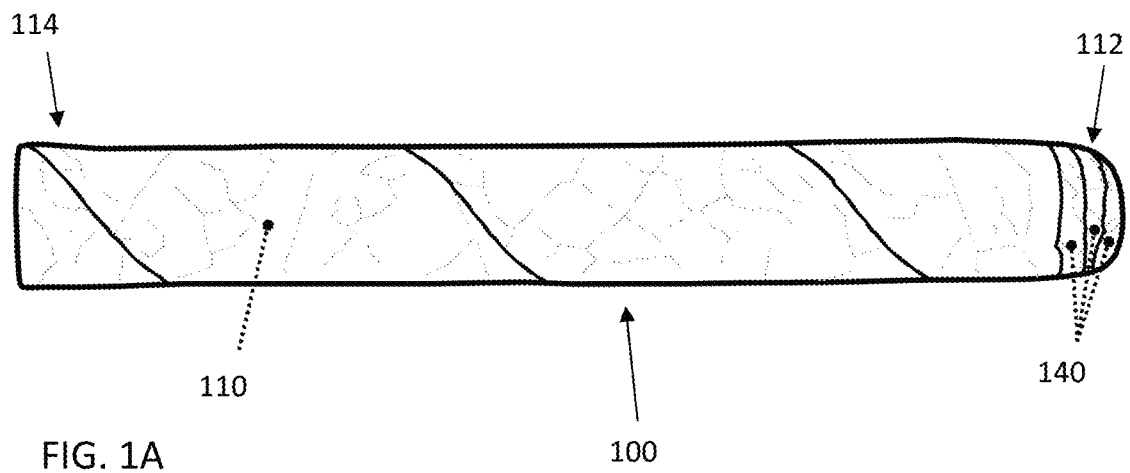
FIG. 1A is a view of a fully assembled cigar showing the externally visible parts thereof.
Figure 1B:
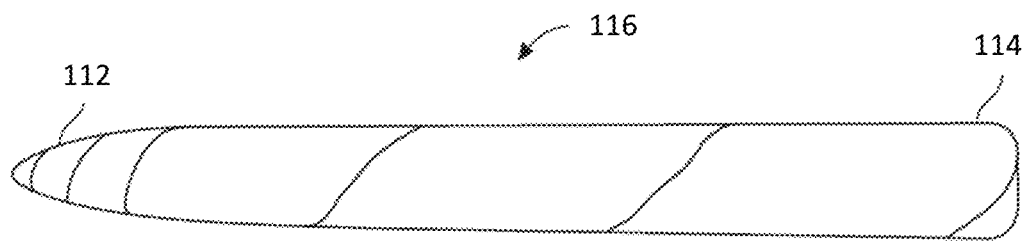
FIGS. 1B-1C are side views of various types of cigars.
Figure 1C:
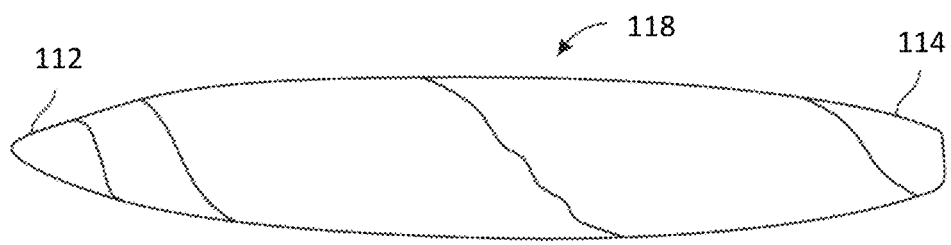

FIGS. 1A-1D illustrate various views of a cigar 100. Many, if not most, cigars 100 adhere to a generally uniform construction or shape. FIG. 1A shows an example of a generic cigar 100 having a head 112 defining the end that is cut prior to use and put in the smoker's mouth to draw air and smoke through the cigar, a foot 114 defining the end that is lit prior to use, a cap 140, and a spiral wrapper 110. Of course, cigars 100 may be manufactured in various diameters, lengths and shapes. FIGS. 1B-1C illustrate two different specific types of cigars: FIG. 1B is generally referred to as a "torpedo," "belicoso," or "pyramid" cigar. The torpedo cigar 116 has an elongate body defined by a tapered head 112 on one end, and a foot 114 on the other. The torpedo cigar 116 generally increases in diameter all the way from the tip of the head 112 to the end of the foot 114. FIG. 1C is generally referred to as a "perfecto" or "figurado" cigar. The perfecto cigar 118 also has an elongate body defined by a tapered head 112 on one end and a foot 114 on the other end. By contrast to the torpedo cigar 116, the perfecto cigar 118 has a sharper taper in the head 112 and frequently decreases in diameter at the foot 114 as well. The perfecto cigar 118 comes to a sharp or blunt tapered tip at the head 112

Many cigar enthusiasts enjoy a perfecto cigar 118 because the perfecto cigar's 118 shape allows the smoker to cut a relatively small portion off the head 112 of the cigar to have a pleasantly tapered shape that may feel more comfortable in the mouth. However, a common shortcoming of the perfecto cigar 118 is that the tobacco in the tapered head is often tightly compressed during manufacture, by hand or machine, thereby increasing resistance to airflow through the tightly packed tobacco in the tapered head 112 of the cigar. In fact, when premium cigars are hand-rolled, tobacco is forced into the head 112 of the cigar to seal the cigar. This forcing and sealing process, particularly in a perfecto cigar 118 often results in the head 112 being the most tightly packed area of the cigar, leaving clumps of tightly packed tobacco which may impede, restrict, or block the draw of the cigar.

Figure 1D:
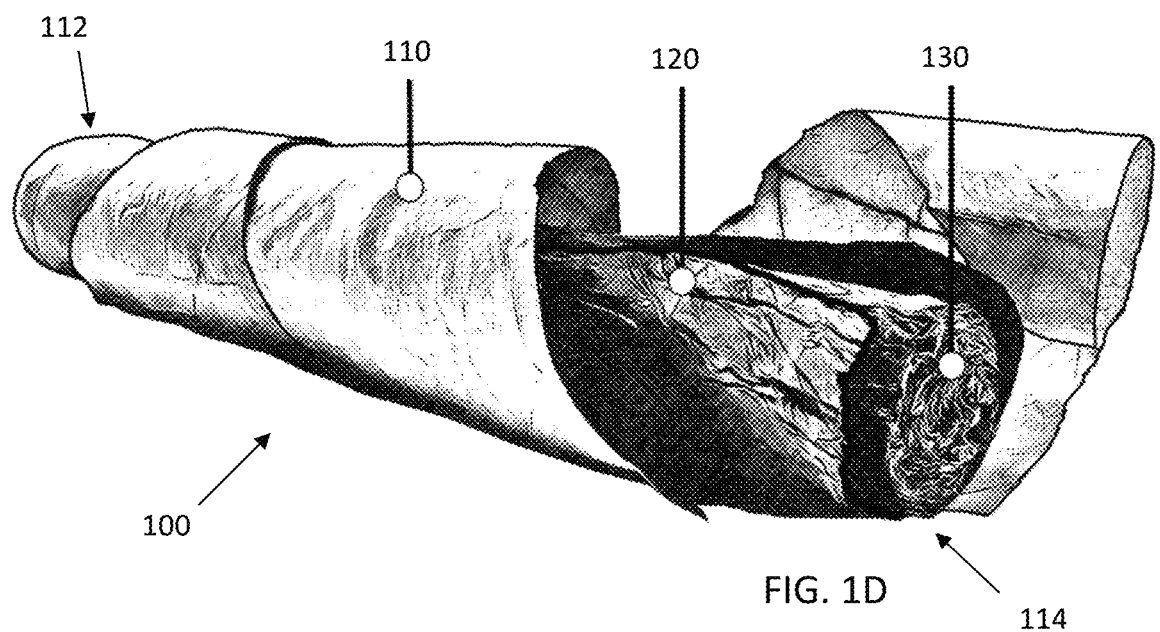
FIG. 1D is a view of a partially-disassembled cigar showing the various parts thereof.

FIG. 1D shows a cigar 100 in a partially disassembled state that enables the viewer to see each individual component of the cigar 100. The cigar 100 includes an inner core of filler 130 which is covered by a binder 120 and then ultimately wrapped in a wrapper 110. More specifically, the cigar 100 is constructed by first molding the tobacco filler leaves 130 into the cigar shape. This is frequently done by hand. After the filler 130 has been formed into the desired shape, it is wrapped in a sturdy tobacco leave binder 120. The binder 120 and filler 130 are then spiral wrapped with a very thin wrapper 110. The wrapper 110 is generally a more fragile, delicate leaf or portion of a leaf. Cigar wrappers 110 are generally applied to the binder 120 in spiral pattern—the wrapper 110 encircles the outside of the cigar 100, i.e., the binder 120 containing the filler 130, in a spiral or barber-pole pattern. Parts of a leaf, e.g., parts of the same wrapper leave, are then used to cover and shape the head 112 of the cigar 100. This covering of the head 112 of the cigar 100 is called the cap 140 (shown in FIG. 1A). One purpose of the cap 140 is to secure the wrapper 110 in place on the cigar 100.

During manufacturing, the wrapper 110 and one or more of the various layers of the cap 140 may be fixed in place on or with respect to the cigar 100 using an adhesive, such as a cigar glue. When being made by hand, cigar rollers (known as torcedors, dip their fingers into bowls of adhesive, e.g., cigar glue, and wipe the glue on the undersurface edges of the wrapper and on the undersurface of the pieces used to form the cap. That glue is what holds the wrapper 110 and the cap 140 in place to maintain the shape of the cigar 100.

The adhesives used during making a cigar 100, e.g., cigar glue, are generally food-safe adhesives, similar to those used for postage stamps and envelopes. The adhesives derive at least some of their desirable properties, e.g., stickiness, from plant extracts and starch or dextrin combinations that come from plants, such as, but not limited to, yucca, corn, wheat, and rice. Another adhesive that may be used by some manufacturers is gum arabic, which is produced from the Acacia Senegal tree that grows in many areas of Africa and India. Due to its applications, it is desirable that adhesives used during the cigar manufacture process are edible, food-safe, odorless, and tasteless. As cigars are placed directly into the smoker's mouth during use, it is important that any adhesive used in cigar manufacture be both edible and food safe. As cigars are lit during use and the smoke produced drawn in by the smoker during use, it is important that any adhesive used in cigar manufacture produce an acceptable amount, or less, of toxic or harmful byproducts when burnt. Finally, as cigars are smoked at least partially for an enjoyable sensory experience, it is important that any adhesive used in cigar manufacture be either odorless and tasteless or augment the sensory experience.

The cigar enthusiast expends considerable time, effort, and expense in preparing his or her cigar prior to smoking it. Of course, the cigar enthusiast purchases the cigars he or she intends to smoke and any tools that may be necessary. Furthermore, he or she: prepares the tool kit, generally, carefully laying out each tool so that all options may be surveyed; selects the right tools for the occasion (e.g., which cigar lighter or match will suit the cigar and the occasion the best); removes one or more cigars from a cigar carrying case or humidor; experiences the cigars with other cigar enthusiasts; selects the perfect cigar for the occasion; examines and studies the cigar, observing the textures, shapes, dryness, flexibility, brittleness, and many other characteristics; selects the perfect location for a cut on the head of the cigar through which the cigar enthusiast will draw smoke once the cigar is lit; cuts the cigar with care, decision, and precision; performs a cold draw of the cigar; toasts the cigar; and ultimately lights the cigar. Of course, each cigar enthusiast engages in his or her own unique steps of the above ritual. However, each ritual is characterized by care, so that the best smoking experience is achieved for each enthusiast.

While the preparation process is critical, it is merely setting the stage for the ultimate smoking event. Each step is taken so that each draw on the cigar is as enjoyable as possible. The first draw the cigar enthusiast takes identifies for him or her the quality of the draw—the ideal, or perfect draw, is one that is uniform and even, pulling smoke evenly through the entire body of the cigar without excessive effort (suction produced by the cigar enthusiast's mouth). The draw, in simple terms, is how hard/strongly the cigar enthusiast needs to puff on the cigar to draw in the desired amount of air and/or smoke from the cigar. The cigar enthusiast generally considers an ideal or perfect draw, after his or her extensive preparation (possibly before the cigar has been lit with the cold draw, but certainly afterwards), to be one of the most satisfying experiences or parts of the cigar smoking ritual. However, while the cigar enthusiast may control many factors, such as the evenness of the burn, the identity of the cigar, or the tools used, a cigar's draw has been generally difficult if not impossible for the cigar enthusiast to improve: if it is a poor draw, the cigar enthusiast has in the past been helpless to alter its condition.

Any given cigar's draw is determined during the rolling process—by the individual artisan preparing and hand-rolling the cigar. If the cigar is rolled too loosely, there is little to no noticeable restriction on the air and smoke mixture travelling through the cigar during the cigar enthusiast's puff: air and smoke rushes through the cigar as if it was empty. Such a "loose" draw is generally disappointing and leaves the cigar enthusiast dissatisfied. By contrast, if the artisan rolled the cigar too tightly, there may be a mild to serious restriction on the air and smoke mixture travelling through the cigar during the cigar enthusiast's puff, sometimes called a "snug" or a "tight" draw. Encountering a cigar with a draw that is tighter than the individual cigar enthusiast's ideal draw is common and frequently results in diminished enjoyment on the part of the enthusiast. Occasionally, a cigar may be so tightly packed that the cigar enthusiast can barely draw any air into the cigar. Such "snug" or "tight" draws are commonly referred to as a "plugged cigar" and are generally highly disappointing to the enthusiast and often result in a cigar that is un-smokable. Such cigars are frequently discarded. A snug draw is caused by too much tobacco having been packed inside the cigar wrapper. Such excess of tobacco may be packed inside the cigar's wrapper either in specific localized areas of a cigar, or generally throughout the entire length of a cigar. Regardless, such tightly packed cigars frequently require an undesirably high amount of negative pressure to suck air through the cigar. Additionally, some cigars are not uniformly packed throughout the entirety of the cigar (some being more or less uniform). When the tobacco filled is not packed uniformly, smoking of the cigar may start with an even burn, but may become uneven during the smoking process, when a denser area of the cigar is reached. In such cases, the denser area may burn slower than the looser areas around it, causing the cigar to burn faster on one side than the other. When the burn becomes uneven, many cigar enthusiasts will use a flame to touch up their cigars by flaming the part of the cigar that is not burning well, in an attempt to even the burn. Unfortunately, the draw of a cigar is very difficult, if not impossible, to determine prior to cutting, let alone prior to purchase. Consequently, a suboptimal draw (either loose or snug) is a periodic fact of life for most cigar enthusiasts. The cigar's draw is of sufficient importance, that some enthusiasts may store their cigars in suboptimal conditions to help improve the draw. For example, the class humidity to store and smoke cigars is 70% humidity. That being said, the moister the tobacco is, the more it swells. And swollen tobacco takes up more space, thereby potentially creating a tighter draw. Therefore, some cigar enthusiasts, in an attempt to overcome the common snug draw issue, may keep their cigars at lower humidities (e.g., only 62-65%). In lower humidities, the cigars may experience less swelling of the tobacco filler and therefore less tightness.

The cigar enthusiast unfortunate enough to acquire a cigar having a loose draw will likely either discard the cigar, or smoke it dissatisfied. The lack of restriction on airflow in a loose draw cigar allows very rapid and hot burning. Therefore, such a cigar will create more tars and will likely be finished well before other enthusiasts finish their cigars. Both of these results are very undesirable. However, a loose draw is caused by insufficient tobacco being contained in a loose fashion within the cigar, and tobacco can never be added or tightened by the cigar enthusiast. Consequently, it is generally accepted that there is little or nothing that can be done to help or fix a loose draw.

Again, by contrast to a loose draw, a snug draw is caused by too much tobacco being contained in a tightly packed fashion within the cigar. Such cigars are very common. Various solutions to break up the tobacco and decrease airflow resistance (and thereby improve draw) have been suggested or offered, but none of them truly work. Many of these solutions are ice pick-shaped tools that may be used to poke a hole down the long axis of the cigar with the intent of creating a path by which air may flow through the cigar. Unfortunately, such tools frequently do not improve the draw whatsoever. Instead, they merely spread the already over-packed cigar and break the wrapper, thereby destroying the cigar. Even if the wrapper is not broken, the hole merely closes. Such tools do not generally improve the draw of the cigar in any meaningful fashion.

Even beyond the issue/possibility of chronically improper draw, such as the loose or snug draws discussed above, every cigar enthusiast has his or her own ideal level of draw. Each cigar enthusiast has different facial structure, mouth size, and lung volume, among many other characteristics. Consequently each cigar enthusiast is most comfortable creating a different amount of negative pressure on the head of the cigar during smoking. That is to say, each cigar enthusiast prefers his or her own level of suction during smoking (i.e., the ideal amount of resistance to airflow is different for each individual enthusiast). And, for a cigar enthusiast, having the desired or ideal amount of resistance to air flow enhances the cigar smoking experience compared to achieving only an acceptable resistance. However, historically, changing the draw of any given cigar to match the cigar enthusiast's own best preferences has not been a possibility. The cigar enthusiast has been bound by chance—the cigar he or she purchased may be too tight, too loose, just acceptable, or it could be perfect. Most frequently, when the cigar enthusiast tries the first puff after cutting his or her cigar, he discovers that the draw is merely acceptable—the cigar may be smoked, but the draw is slightly too tight. In this case, the cigar enthusiast generally wishes the draw were more suited to his or her tastes, but will smoke it anyway. As mentioned above, there has not been any solution for fixing a snug draw (i.e., making an unacceptably tight cigar acceptable). Moreover, there has not been any solution for slightly improving a draw (i.e., making an acceptable draw ideal or "perfect").

Even when the cigar enthusiast has obtained a cigar with an acceptable or perfect draw, he or she may experience an air leak through the thin, fragile wrapper 110, for example, on the side of the cigar 100. When there is an air leak through the side of the cigar, atmospheric air may be drawn into the cigar through the site of the leak. Therefore, when a leak is present during smoking, a portion of the air drawn in by the smoker will be enjoyable smoke, while another portion of the air drawn in by the smoker will be plain atmospheric air. The proportion of atmospheric air to smoke may vary depending on the size of the leak. Mixing of atmospheric air and smoke during smoking dilutes the smoke being drawn into the mouth, which is considered an unpleasant and frustrating condition.

The filler 130 contained within a cigar 100 is generally oriented longitudinally along the cigar 100. Additionally, the binder leaves 120 generally serve a predominantly structural purpose, e.g., to give the filler 130 and the ultimate cigar 100 its proper, desirable shape. However, the sturdy tobacco leaves used as the binder 120 typically have numerous cracks and holes. Therefore, it is generally the thin, fragile outer tobacco wrapper leaves 110 (e.g., glued and spiral wrapped) that seals the sides of the cigar against air leaks. While air leaks may be formed in any of a number of ways, they frequently result from cracks and/or holes in the thin and fragile cigar wrapper 110. Alternatively, air leaks may result from the edge of the spiral-wrapped cigar wrapper 110 lifting up, e.g., from insufficient adhesive being used or other factors, allowing air to leak into the body of the cigar between the spiral wraps of the wrapper 110.

When a leak is discovered in a cigar, the cigar enthusiast may attempt to repair the cigar. If the leak is discovered prior to lighting the cigar, more time may be taken to patch the leak. However, if the leak is discovered after lighting the cigar, a more immediate solution is necessary as each cigar has a finite burn time. Indeed, when cigar smokers realize there is an air leak in their cigar, they desire to seal the air leak immediately, so they may continue smoking their cigar. When an air leak is large enough to be easily visible, some cigar smokers may hold a finger over the air leak whenever they draw on the cigar. While manually covering a leak may be partially successful in decreasing undesirable effects of the leak, such practices are frustrating and undesirable for the smoker. Adhesives, such as the adhesives used during cigar manufacture may be used to repair cigars and/or patch air leaks. Generally, however, cigar adhesives do not seal air leaks well unless the adhesive is painted onto the air leak and allowed considerable time to dry (e.g., conventional cigar adhesives lend themselves best to the repair of unlit cigars). However, even upon drying, most cigar adhesives do not seal air leaks well: when adhesive is applied over an air leak, and the cigar is drawn on prior to complete drying of the adhesive, the adhesive is simply sucked through the air leak and into the cigar without properly or effectively sealing the leak.

Air leaks due to holes or cracks in the sides of a wrapped cigar 100 may also be repaired or partially repaired using a combination of adhesive and patches, e.g., small pieces of tobacco leaf. To use patches, a layer of adhesive is placed on the back of a patch and the patch placed over the site of the leak. The adhesives used may be similar to, if not the same, as those used during manufacture of the cigar 100 (e.g., the adhesive may be a vegetable based composition or mucilage such as a seaweed based adhesive). However, patches may be undesirable as they require the smoker to maintain a supply of maintained, e.g., humidified or otherwise, patches. Furthermore, patches may need to be allowed to dry for several hours prior to smoking.

Figure 2:
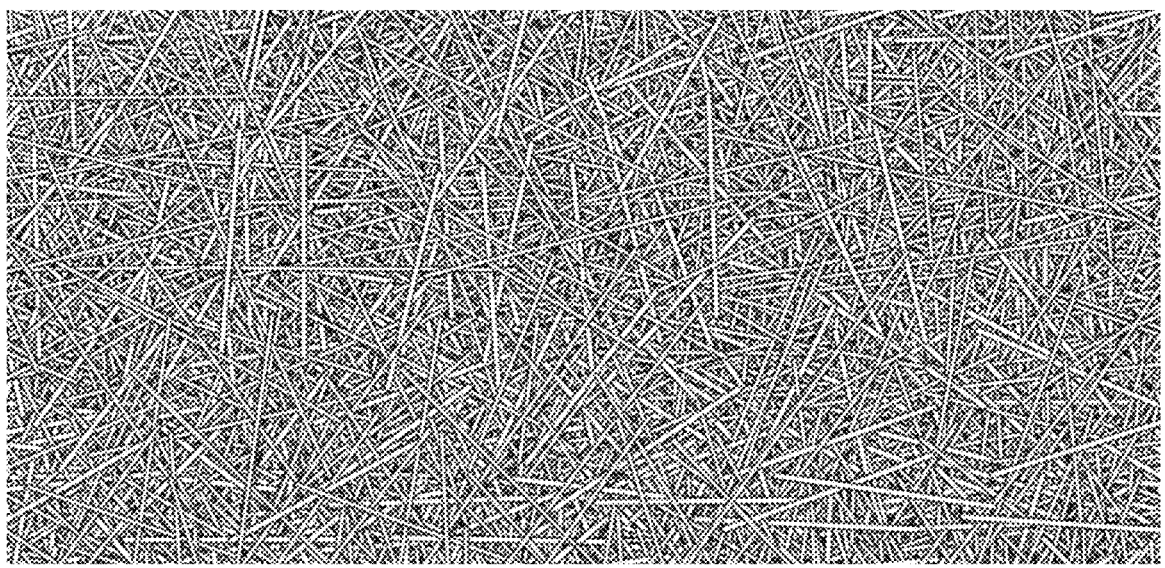
FIG. 2 is a magnified view of an embodiment of a cigar repair glue containing a fiber mat.

In some embodiments, fibrous cigar glues and adhesives are made using insoluble fibers. Such fibers may be extremely small, very thin, and elongated. Incorporation of an insoluble fiber into a cigar glue or adhesive may improve the holding power of the glue and/or adhesive. Fibrous glues and/or adhesive (e.g., glues and/or adhesives containing a quantity of an insoluble fiber) may be made by combining a quantity of glue and/or adhesive with a quantity of insoluble fiber. Insoluble fiber may advantageously be used so that upon mixing the fiber with the glue and/or adhesive, the fiber does not disappear or dissolve into solution. FIG. 2 illustrates a glue, e.g., a dried glue, to which fibers have been added resulting in a crisscrossing of thin, elongated fibers forming a woven net.

Insoluble fibers may be added to nearly any type of glue and/or adhesive according to some embodiments disclosed herein. In some embodiments, insoluble fibers are added to any type of cigar glue to make a fibrous or fiber-containing or matting cigar glue. Subject to the type of glue being used, one of ordinary skill in the art will understand what is meant by the term "insoluble"—what may be insoluble for one type of glue may not be insoluble for another type of glue or adhesive. In some embodiments, a water-based glue or adhesive is used. In such embodiments, a fiber that is insoluble in aqueous solutions and/or aqueous mixtures may be used.

While the use of insoluble fibers is advantageous for the reasons discussed herein, e.g., stability and longevity, other types of fibers may also be used. In some embodiments, substantially insoluble fibers are used. In some embodiments, substantially insoluble fibers are those that remain greater than about 60% intact after one year in the glue or adhesive. In some embodiments, substantially insoluble fibers are those that remain at least about 65%, 70%, 75%, 80%, 85%, 90%, 95%, or more intact at least six months or one year. In some examples, the insoluble fibers remain intact for at least six months or one year after mixing in at least about 65%, at least about 70%, at least about 75%, at least about 80%, at least about 85%, at least about 90%, or at least 95% or more of insoluble fiber into the glue and/or adhesive. In some embodiments, substantially insoluble fibers are those that remain at least 90% intact for at least 1 month, at least 2 months, at least 3 months, at least 4 months, at least 5 months, at least 6 months, at least 7 months, at least 8 months, at least 9 months, at least 10 months, at least 11 months, at least 12 months, at least 13 months, at least 14 months, at least 15 months, at least 16 months, at least 17 months, at least 18 months, at least 19 months, at least 20 months, at least 21 months, at least 22 months, at least 23 months, or at least 24 months. In some embodiments, substantially insoluble fibers are those that remain at least 80% intact for at least 1 month, at least 2 months, at least 3 months, at least 4 months, at least 5 months, at least 6 months, at least 7 months, at least 8 months, at least 9 months, at least 10 months, at least 11 months, at least 12 months, at least 13 months, at least 14 months, at least 15 months, at least 16 months, at least 17 months, at least 18 months, at least 19 months, at least 20 months, at least 21 months, at least 22 months, at least 23 months, or at least 24 months. In some embodiments, substantially insoluble fibers are those that remain at least 70% intact for at least 1 month, at least 2 months, at least 3 months, at least 4 months, at least 5 months, at least 6 months, at least 7 months, at least 8 months, at least 9 months, at least 10 months, at least 11 months, at least 12 months, at least 13 months, at least 14 months, at least 15 months, at least 16 months, at least 17 months, at least 18 months, at least 19 months, at least 20 months, at least 21 months, at least 22 months, at least 23 months, or at least 24 months. In some embodiments, substantially insoluble fibers are those that remain at least 60% intact for at least 1 month, at least 2 months, at least 3 months, at least 4 months, at least 5 months, at least 6 months, at least 7 months, at least 8 months, at least 9 months, at least 10 months, at least 11 months, at least 12 months, at least 13 months, at least 14 months, at least 15 months, at least 16 months, at least 17 months, at least 18 months, at least 19 months, at least 20 months, at least 21 months, at least 22 months, at least 23 months, or at least 24 months.

In some embodiments, a fibrous glue and/or adhesive (e.g., glue and/or adhesive containing a quantity of an insoluble fiber) contains a percentage of fibers by weight. In some embodiments, the fibrous glue and/or adhesive contains less than about 60% of insoluble fibers by weight. In some embodiments, the fibrous glue and/or adhesive contains less than about 55% insoluble fibers by weight, less than about 50% insoluble fibers by weight, less than about 45% insoluble fibers by weight, less than about 40% insoluble fibers by weight, less than about 35% insoluble fibers by weight, less than about 30% insoluble fibers by weight, less than about 25% insoluble fibers by weight, less than about 20% insoluble fibers by weight, less than about 15% insoluble fibers by weight, less than about 10% insoluble fibers by weight, or less than about 5% insoluble fibers by weight. In some embodiments the fibrous glue and/or adhesive contains between about 1-30% insoluble fibers by weight, between about 2-28% insoluble fibers by weight, between about 3-26% insoluble fibers by weight, between about 4-24% insoluble fibers by weight, between about 5-22% insoluble fibers by weight, between about 6-20% insoluble fibers by weight, between about 7-18% insoluble fibers by weight, between about 8-16% insoluble fibers by weight, between about 9-14% insoluble fibers by weight, between about or 1-12% insoluble fibers by weight. In some embodiments, the fibrous glue and/or adhesive contains less than about 50% insoluble fibers by weight, less than about 48% insoluble fibers by weight, less than about 46% insoluble fibers by weight, less than about 44% insoluble fibers by weight, less than about 42% insoluble fibers by weight, less than about 40% insoluble fibers by weight, less than about 38% insoluble fibers by weight, less than about 36% insoluble fibers by weight, less than about 34% insoluble fibers by weight, less than about 32% insoluble fibers by weight, less than about 30% insoluble fibers by weight, less than about 28% insoluble fibers by weight, less than about 26% insoluble fibers by weight, less than about 24% insoluble fibers by weight, less than about 22% insoluble fibers by weight, less than about 20% insoluble fibers by weight, less than about 19% insoluble fibers by weight, less than about 18% insoluble fibers by weight, less than about 17% insoluble fibers by weight, less than about 16% insoluble fibers by weight, less than about 15% insoluble fibers by weight, less than about 14% insoluble fibers by weight, less than about 13% insoluble fibers by weight, less than about 12% insoluble fibers by weight, less than about 11% insoluble fibers by weight, less than about 10% insoluble fibers by weight, less than about 9% insoluble fibers by weight, less than about 8% insoluble fibers by weight, less than about 7% insoluble fibers by weight, less than about 6% insoluble fibers by weight, less than about 5% insoluble fibers by weight, less than about 4% insoluble fibers by weight, less than about 3% insoluble fibers by weight, less than about 2% insoluble fibers by weight, or less than about 1% insoluble fibers by weight. In some embodiments the fibrous glue and/or adhesive contains between about 0-30% insoluble fibers by weight, between about 0.5-29% insoluble fibers by weight, between about 1-28% insoluble fibers by weight, between about 1.5-27% insoluble fibers by weight, between about 2-26% insoluble fibers by weight, between about 2.5-25% insoluble fibers by weight, between about 3-24% insoluble fibers by weight, between about 3.5-23% insoluble fibers by weight, between about 4-22% insoluble fibers by weight, between about 4.5-21% insoluble fibers by weight, between about 5-20% insoluble fibers by weight, between about 5.5-19% insoluble fibers by weight, between about 6-18% insoluble fibers by weight, between about 6.5-17% insoluble fibers by weight, between about 7-16% insoluble fibers by weight, between about 7.5-15% insoluble fibers by weight, between about 8-14% insoluble fibers by weight, between about 8.5-13% insoluble fibers by weight, between about 9-12% insoluble fibers by weight, between about 9.5-11% insoluble fibers by weight, between about 10-10.5% insoluble fibers by weight, or any other amount of insoluble fibers that advantageously creates a fiber mat as disclosed herein.

As disclosed herein, insoluble fibers may be used to create a fibrous glue and/or adhesive. Various different types of insoluble fibers may be used including fibers having various different sizes and characteristics. In some embodiments, the insoluble fibers may have an average length between about 40-120 μm in length and an average of between about 1-3 μm in diameter. In some embodiments, the insoluble fibers may have a length of less than about 1000 μm, less than about 900 μm, less than about 800 μm, less than about 700 μm, less than about 600 μm, less than about 500 μm, less than about 490 μm, less than about 480 μm, less than about 470 μm, less than about 460 μm, less than about 450 μm, less than about 440 μm, less than about 430 μm, less than about 420 μm, less than about 410 μm, less than about 400 μm, less than about 390 μm, less than about 380 μm, less than about 370 μm, less than about 360 μm, less than about 350 μm, less than about 340 μm, less than about 330 μm, less than about 320 μm, less than about 310 μm, less than about 300 μm, less than about 290 μm, less than about 280 μm, less than about 270 μm, less than about 260 μm, less than about 250 μm, less than about 240 μm, less than about 230 μm, less than about 220 μm, less than about 210 μm, less than about 200 μm, less than about 190 μm, less than about 180 μm, less than about 170 μm, less than about 160 μm, less than about 150 μm, less than about 140 μm, less than about 130 μm, less than about 120 μm, less than about 110 μm, less than about 100 μm, less than about 90 μm, less than about 80 μm, less than about 70 μm, less than about 60 μm, less than about 50 μm, less than about 40 μm, less than about 30 μm, less than about 20 μm, or less than about 10 μm. In some embodiments, the insoluble fibers may have a length of between about 10-600 μm, between about 15-575 μm, between about 20-550 μm, between about 25-525 μm, between about 30-500 μm, between about 35-475 μm, between about 40-450 μm, between about 45-425 μm, between about 50-400 μm, between about 55-375 μm, between about 60-350 μm, between about 65-350 μm, between about 70-325 μm, between about 75-300 μm, between about 80-275 μm, between about 85-250 μm, between about 90-225 μm, between about 95-200 μm, between about 100-175 μm, between about 105-150 μm, or between about 110-125 μm. In some embodiments, the insoluble fibers may have a length of between about 10-150 μm, between about 15-145 μm, between about 20-140 μm, between about 25-135 μm, between about 30-130 μm, between about 35-125 μm, between about 40-120 μm, between about 45-115 μm, between about 50-110 μm, between about 55-105 μm, between about 60-100 μm, between about 65-95 μm, between about 70-90 μm, or between about 75-85 μm In some embodiments, the insoluble fibers may have a diameter of less than about 100 μm, less than about 98 μm, less than about 96 μm, less than about 94 μm, less than about 92 μm, less than about 90 μm, less than about 88 μm, less than about 86 μm, less than about 84 μm, less than about 82 μm, less than about 80 μm, less than about 78 μm, less than about 76 µm, less than about 74 µm, less than about 72 µm, less than about 70 µm, less than about 68 µm, less than about 66 µm, less than about 64 µm, less than about 62 µm, less than about 60 µm, less than about 58 µm, less than about 56 µm, less than about 54 µm, less than about 52 µm, less than about 50 µm, less than about 48 µm, less than about 46 µm, less than about 44 µm, less than about 42 µm, less than about 40 µm, less than about 38 µm, less than about 36 µm, less than about 34 µm, less than about 32 µm, less than about 30 µm, less than about 29 µm, less than about 28 µm, less than about 27 µm, less than about 26 µm, less than about 25 µm, less than about 24 µm, less than about 23 µm, less than about 22 µm, less than about 21 µm, less than about 20 µm, less than about 19 µm, less than about 18 µm, less than about 17 µm, less than about 16 µm, less than about 15 µm, less than about 14 µm, less than about 13 µm, less than about 12 µm, less than about 11 µm, less than about 10 µm, less than about 9 µm, less than about 8 µm, less than about 7 µm, less than about 6 µm, less than about 5 µm, less than about 4 µm, less than about 3 µm, less than about 2 µm, or less than about 1 µm. In some embodiments, the insoluble fibers may have a diameter of between about 0.5-10 µm, between about 1-9 µm, between about 1.5-8 µm, between about 2-7 µm, between about 2.5-6 µm, between about 3-5 µm, or between about 3.5-4 µm. In some embodiments, the insoluble fibers may have a diameter of less than about 10 µm, less than about 9.5 µm, less than about 9 µm, less than about 8.5 µm, less than about 8 µm, less than about 7.5 µm, less than about 7 µm, less than about 6.5 µm, less than about 6 µm, less than about 5.5 µm, less than about 5.25 µm, less than about 5 µm, less than about 4.75 µm, less than about 4.5 µm, less than about 4.25 µm, less than about 4 µm, less than about 3.75 µm, less than about 3.5 µm, less than about 3.25 µm, less than about 3 µm, less than about 2.75 µm, less than about 2.5 µm, less than about 2.25 µm, less than about 2 µm, less than about 1.75 µm, less than about 1.5 µm, less than about 1.25 µm, less than about 1 µm, less than about 0.75 µm, less than about 0.5 µm, or less than about 0.25 µm. In some embodiments, the insoluble fibers may have a diameter of between about 0.1-4 µm, between about 0.2-3.9 µm, between about 0.3-3.8 µm, between about 0.4-3.7 µm, between about 0.5-3.6 µm, between about 0.6-3.5 µm, between about 0.7-3.4 µm, between about 0.8-3.3 µm, between about 0.9-3.2 µm, between about 1-3.1 µm, between about 1.1-3 µm, between about 1.2-2.9 µm, between about 1.3-2.8 µm, between about 1.4-2.7 µm, between about 1.5-2.6 µm, between about 1.6-2.5 µm, between about 1.7-2.4 µm, between about 1.8-2.3 µm, between about 1.9-2.2 µm, or between about 2-2.1 µm.

As discussed above, any type of glue or adhesive may be made into a fibrous, fiber-containing, matting, or woven glue or adhesive by adding in an appropriate insoluble fiber, as disclosed herein. In some embodiments, an aqueous cigar glue is used to prepare a matting cigar glue. In some embodiments, the insoluble fiber is an insoluble cellulose fiber. All plants have a high cellulose contention. Indeed, cellulose is the structural component of plants. For example, wood is dense cellulose. However, plant-based foods, e.g., vegetables, fruits, etc., also contain cellulose fibers. Cellulose fibers are what makes up the healthy, advantageous, "dietary fiber" that is consumed as part of many diets. Tobacco plants, also, contain significant amounts of cellulose. In fact, tobacco leaves contain, on average, about 10-14% cellulose. As will be easily understood, therefore, cellulose does not affect, e.g., change, the flavor of tobacco—tobacco already contains significant amounts of the material. When smoking any cigar, the cigar smoker is inherently smoking a significant amount of cellulose. Therefore, the addition of insoluble cellulose fibers to a cigar glue advantageously has little to no effect on the smoker's perception of the cigar, e.g., no change in flavor of smoke, quantity of smoke, density of smoke, etc. Cellulose fibers are insoluble, or substantially insoluble, in aqueous solutions and aqueous mixtures. Adding cellulose fibers to any aqueous cigar glue and/or adhesive may result in an advantageous crisscrossing of the cellulose fibers, creating a woven net, such as is shown in FIG. 2. When cellulose fibers are properly mixed into a cigar glue and/or adhesive, the resulting matting or woven/weaving glue may be advantageously used to create a woven net over an air leak on the side of a cigar. The fibrous cellulose creates a mat over the defect in the cigar wall and advantageously stops the leak quickly, sometimes even without drying (e.g., complete drying) of the glue and/or adhesive. Matting glues, as disclosed herein may advantageously stop air leaks in a cigar even before the glue has had a chance to start drying because the net (e.g., web, network, screen, netting, mesh, knot, network, tangle) of crisscrossed insoluble fibers can be sucked firmly down over the air leak, e.g., with the smoker draws on the cigar. As the network of fibers is sucked down into the air leak, the leak may be plugged and sealed almost instantly.

Figure 3:
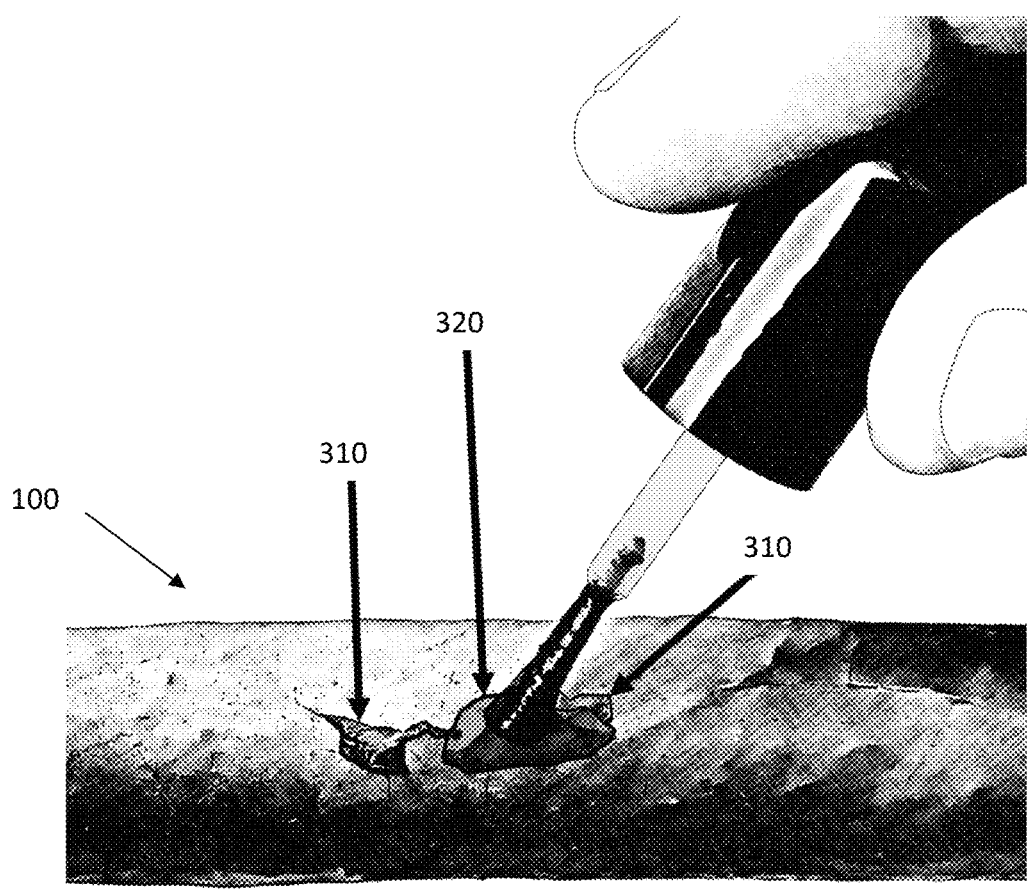
FIG. 3 is a view of a cigar being repaired using an applicator brush and glue.

FIG. 3 illustrates a matting glue as disclosed herein being applied to a cigar 100. As shown, a fibrous cigar repair glue 320 may be dabbed onto a crack 310 using a small brush or other tool. As disclosed herein, the fibrous cigar repair glue 320 may be allowed to dry, or the smoker may immediately begin to smoke the cigar. In the event that the cigar smoker decides to allow the fibrous cigar repair glue 320 to dry, the fibrous cigar repair glue 320 forms a fibrous network or mesh covering the crack 310 that blocks the passage of air, thereby fixing the air leak. In the event that the cigar smoker decides to immediately smoke the cigar, the fibrous cigar repair glue 320 is sucked into the crack 310, e.g., at least partially sucked into the crack 310, upon the first draw on the cigar. As the fibrous cigar repair glue 320 is sucked into the crack 310, the fibrous cigar repair glue 320 plugs the crack 310 and the air leak is stopped.

Figure 4:
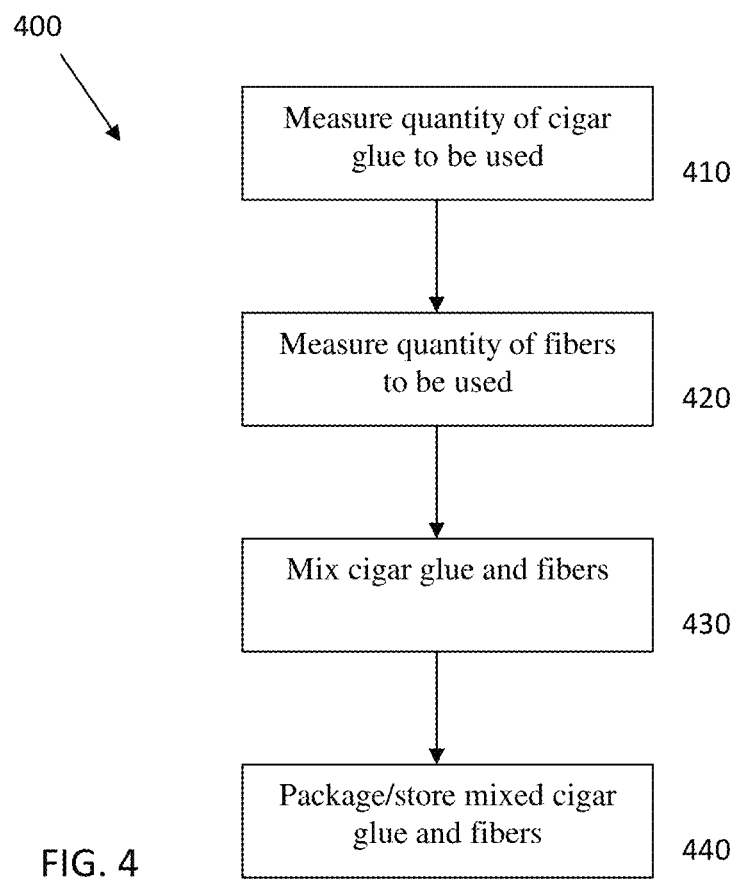
FIG. 4 is a flow chart of an embodiment for producing a cigar glue.

FIG. 4 illustrates a method of producing a fibrous cigar glue 400. At step one 410, a quantity of glue or adhesive, e.g., cigar glue is measured. In some embodiments, the measurement may be done by weight. In some embodiments, the measurement of the glue or adhesive may be done by volume. In some embodiments, the measurement may be done visually, e.g., "eyeballing" the amount. At step two 420, a quantity of insoluble or substantially insoluble fibers is measured. In some embodiments, the measurement of the fibers may be done by weight. In some embodiments, the measurement may be done by volume. In some embodiments, the measurement may be done visually, e.g., "eyeballing" the amount. At step three 430 the glue and fibers are mixed. One of ordinary skill in the art will readily understand the numerous methods of mixing that may be used. Generally, simple stirring is sufficient. However, many types of insoluble fibers are sufficiently heavy that they do not remain in suspension for more than a short time (e.g., no more than about 10-15 minutes). Therefore, the packaging and/or storage of the prepared matting glue may take this into account. At step four 440, the prepared fibrous glue or adhesive is packaged and/or stored. As many fibers tend to precipitate out relatively quickly, the fibrous glue or adhesive may be packaged in a container with a mixing tool. For example, the fibrous glue may be packaged in a bottle (e.g., a glass bottle) containing a quantity of metal balls: the entire bottle containing the fibrous glue and the metal balls may be shaken to re-suspend the fibers for use (after fiber precipitation). Subject to the insolubility of the fibers, the packaged glue may be stored for an extended period of time.

Figure 5:
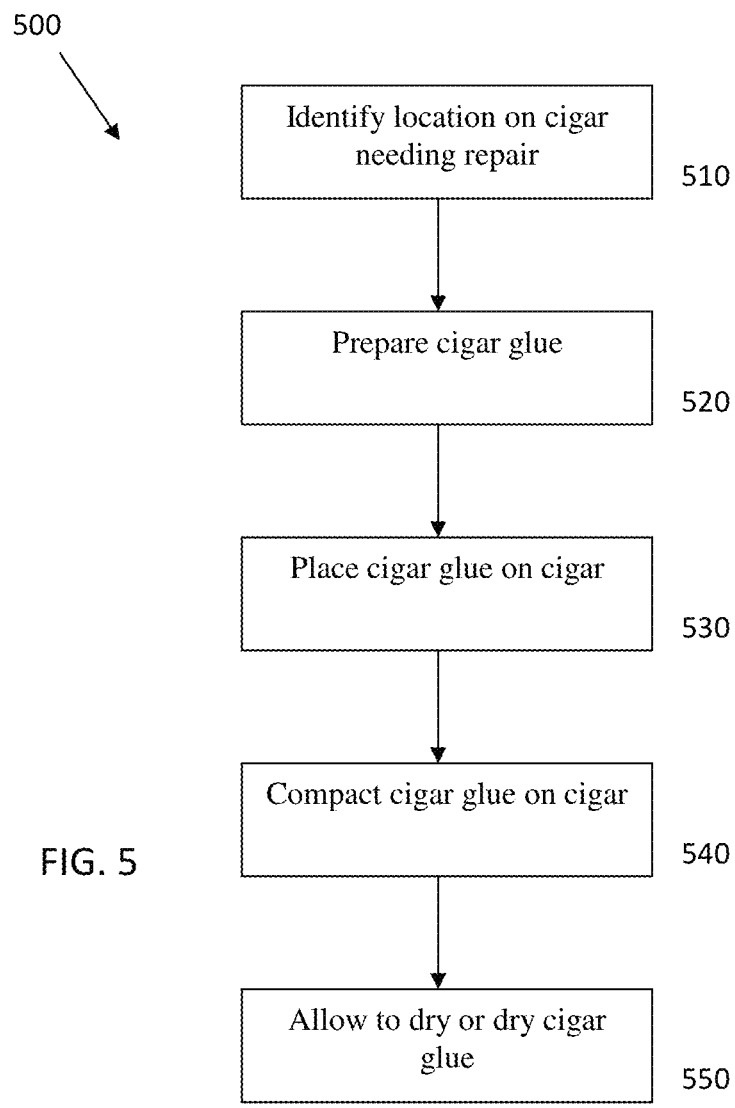
FIG. 5 is a flow chart of an embodiment for repairing a cigar using cigar glue.

FIG. 5 illustrates a method of repairing a cigar 500 using a fibrous or matting cigar glue or adhesive as disclosed herein. At step one 510, a cigar smoker identifies a location on his or her cigar where repair is needed, e.g., the site or an air leak, the site of a leaf lifting, the site of a hole, the site of a crack, etc. At step two 520, the cigar smoker prepares the fibrous or matting cigar glue. If the fibrous or matting cigar glue has been sitting for sufficiently long that the insoluble or substantially insoluble fibers have precipitated out, e.g., are all sitting on the bottom of the volume of glue, the cigar smoker may stir or shake the glue (as discussed herein, the glue container may advantageously contain bearings so that a mere shake of the glue bottle can re-suspend the fibers). After preparing the glue, e.g., re-suspending the fibers, the cigar smoker may apply the fibrous or matting glue to the cigar. For example, a cigar glue containing cellulose fibers may be applied over a crack, hole, lifted edge of the wrapper or over any other source of air leakage using any method of application. In some embodiments, the glue may be applied by dabbing or painting the fibrous or matting glue on top of an air leak or crack in the wrapper. Alternatively, the fibrous or matting glue may be applied by dabbing it on the air leak source with a finger, with any solid object such as a popsicle stick, or applied in any manner whatsoever. At step four 540 the cigar smoker may optionally compact the fibrous or matting cigar glue on the cigar. For example, the cigar smoker may apply the glue liberally, wait for a moment until the glue becomes tacky, but not yet dry, then gently compress the cigar glue. Compacting the cigar glue may advantageously form a tighter mat of fibers, push the mat of fibers and/or glue into the crack or air leak, and thereby improve sealing of the fibrous or matting glue. At step five 550, the cigar smoker may optionally allow to dry or dry the cigar glue. In some embodiments, the cigar smoker merely waits for the glue to dry, e.g., air drying for a time. In some embodiments, the cigar smoker may use a heat gun, or air blower to dry the glue. In some embodiments, the cigar smoker may use a match or lighter to provide heat to dry the glue. Once the mixture of any type of cigar glue and insoluble fibers, e.g., cellulose fibers, is applied over an air leak on the side of a cigar, the fibers crisscross to form a net over the air leak, sealing the air leak, e.g., sealing the air leak immediately, allowing the cigar smoker to continue smoking and enjoying his or her cigar.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although cigar repair glues and methods for repairing cigars using such glues have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes or types of cigar repair glues and methods for repairing cigars using such glues. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

In summary, various embodiments and examples of cigar repair glues and methods for repairing cigars using such glues have been disclosed. Although the cigar repair glues and methods for repairing cigars using such glues have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

What is claimed is:

1. An aqueous adhesive for use on an air leak on a cigar, the adhesive comprising:
an insoluble fiber material,
wherein the fiber material comprises fibers having a length between about 40 μm and about 150 μm,
wherein the fibers have an average diameter of between about 1 μm and about 3 μm,
wherein the adhesive is configured to achieve one or more selected from the group consisting of: form a net over the air leak; form a matting or woven glue; and create a mat over the air leak even without complete drying of the adhesive, and
wherein the insoluble fiber is configured to precipitate out of the aqueous adhesive and form a bottom layer in the aqueous adhesive when the aqueous adhesive is in a packaging.

2. The aqueous adhesive of claim 1, wherein the fiber material is configured to remain intact one year after mixing the fiber material in the adhesive, wherein the fiber material comprises at least about 65% by weight of the adhesive.

3. The aqueous adhesive of claim 1, wherein the fibers are configured to remain intact six months after mixing at least about 65% fiber in the adhesive.

4. The aqueous adhesive of claim 1, wherein the fibers remain at least 90% intact for at least 1 month.

5. The aqueous adhesive of claim 1, wherein the adhesive comprises less than about 60% of insoluble fibers by weight.

6. The aqueous adhesive of claim 1, wherein the adhesive comprises between about 1% and about 30% insoluble fibers by weight.

7. The aqueous adhesive of claim 1, wherein the fibers comprise cellulose.

8. The aqueous adhesive of claim 1, wherein the adhesive is configured to form a net over the air leak.

9. The aqueous adhesive of claim 8, wherein the net can be sucked into the air leak to plug and seal the air leak.

10. The aqueous adhesive of claim 1, wherein the adhesive is configured to form a matting or woven glue.

11. The aqueous adhesive of claim 1, wherein the adhesive is configured to create a mat over the air leak even without complete drying of the adhesive.

12. The aqueous adhesive of claim 1, wherein the insoluble fiber material is temporarily suspended in the aqueous adhesive.

13. The aqueous adhesive of claim 12, wherein the aqueous adhesive is packaged in a container with a mixing tool that is configured to re-suspend the insoluble fiber material for use.

14. The aqueous adhesive of claim 13, wherein the mixing tool is a plurality of metal balls.

15. An aqueous adhesive for use on an air leak on a cigar, comprising:
an insoluble fiber material,
wherein the fiber material comprises fibers having a length between about 10 μm and about 600 μm,
wherein the fibers have an average diameter of between about −0.5 μm and about 10 μm,
wherein the adhesive is transformable to a configuration that forms a net over the air leak on the cigar, and
wherein the insoluble fiber is configured to precipitate out of the aqueous adhesive and form a bottom layer in the aqueous adhesive when the aqueous adhesive is in a packaging.

16. An aqueous adhesive for use on an air leak on a cigar, comprising:
an insoluble fiber material,
wherein the fiber material comprises fibers having a length between about 10 μm and about 1000 μm,
wherein the fibers have an average diameter of between about 1 μm and about 100 μm,
wherein the adhesive is transformable to a configuration that forms a matting over the air leak even without complete drying of the adhesive, and
wherein the insoluble fiber is configured to precipitate out of the aqueous adhesive and form a bottom layer in the aqueous adhesive when the aqueous adhesive is in a packaging.

* * * * *